UNITED STATES PATENT OFFICE.

HAYDN M. BAKER, OF BROOKLYN, NEW YORK.

RESORCIN-BLUE COMPOUND.

SPECIFICATION forming part of Letters Patent No. 348,816, dated September 7, 1886.

Application filed August 31, 1885. Serial No. 175,801. (Specimens.)

*To all whom it may concern:*

Be it known that I, HAYDN M. BAKER, a citizen of the United States, residing at Brooklyn, E. D., in the county of Kings and State of New York, have invented a certain new and useful Process for the Manufacture of a Resorcin-Blue, whereof the following is a specification.

The special purpose of my invention is the transformation of resorcin, having an accepted chemical formula—$C_6H_4(O_2H_2)$—into what I term "resorcin-blue," which is possessed of the empyric formula $C_{18}H_{12}N_2O_6$, which is adapted for use principally as a dye, but may also be used for other purposes.

My invention consists in the novel process or mode of procedure, hereinafter specified, and also includes the specific product of such process, which is distinguished by its novel chemical deportment and by other characteristics, as pointed out in this specification.

In carrying out my invention I proceed as follows: I place in a suitable dish a quantity of resorcin, to which is added a solution of caustic ammonia in water in excess to effect a solution. To this ammonio-resorcin solution I add, by preference, a solution of ammonio-carbonate of copper, equal in weight, or substantially so, to the resorcin employed, as a greater quantity is superfluous, while a less amount retards the process. I now place the dish containing the mingled solutions of ammonio-resorcin and ammonio-carbonate of copper in or upon a convenient support, and dip therein a copper plate, which may be in the form of a disk mounted on a shaft, by which it is slowly revolved, its lower edge lying, during rotation, in the solution, and being submerged therein to a point where it can revolve without obstruction. It is evident, however, that this operation may be conducted in other ways than through the medium of a revolving copper disk—as, for example, by the repeated dipping in the solution of a copper plate or plates. During the period occupied by the operation last mentioned ammonia-water is added from time to time to keep the solution alkaline and replace the loss by volatilization. The chemical changes are established at once, the resorcin, copper, ammonia, air, and water, becoming involved in the transformations at ordinary temperatures. These chemical changes consist of molecular transpositions among the resorcin groups, the formation of cuprous ammonia-water and amidogen, two molecules of the latter compound entering into combination with three resorcin residues in the places of the displaced hydrogen atoms. The motion of the metallic copper from the solution and through the air and back again forms ammonio-suboxide of copper, which dissolves in the excess of ammonia, making a solution that acts at once upon the resorcin like a battery, producing the chemical combination of two amidogen groups in the resorcin molecule residues.

To ascertain when the transformations are completed, a small portion of the solution which has been subjected to the treatment described is removed from the vessel and evaporated to dryness at a temperature not exceeding 212° Fahrenheit. The dry residue is then digested with lukewarm water, which dissolves out any untransformed resorcin, forming a solution which may be mixed with a small quantity of ether or alcohol, to which a little sodium nitrite is added, and followed with enough hydrochloric acid to liberate the nitrous acid from the sodium nitrite. This operation and the attendant reaction produces a yellow trinitro-resorcin, if the mixed aqueous and etherial or alcoholic solution contains free or untransformed resorcin.

Instead of the above test, I may add to the aqueous solution mentioned a dilute solution of ferric chloride, which strikes a dark violet color, if free resorcin is present.

By either or both of these tests it may be readily ascertained whether the process of treatment has been carried to such a point that no free or untransformed resorcin remains in the solution. When this fact is ascertained, the entire solution is treated as follows: The solution is first neutralized by the addition of an acid, preferably hydrochloric, which is added in excess and the solution is then boiled. The coloring-matter precipitates on cooling, and may then be filtered out, or the supernatant fluid decanted and the color collected and dried. This completes the manufacture of the coloring-matter for ordinary commercial purposes. I have found, however, in practice that the isolation of the coloring-matter, after the transformations are complete, will more perfectly obtain by immersing a sheet of metallic zinc in the solution until all the copper is precipitated in the metallic condition; but this course is not imperative nor indispensable, but is the course I prefer. Otherwise, when this course is pursued, it is proper, after the precipitation of the copper, to filter the solution which contains the color and then add dilute sulphuric or hydrochloric acid in excess and boil. After cooling, the coloring-matter precipitates, and may be collected by filtration or decantation. The color is then dried, whereupon it is ready for use as a dye, said color being my resorcin-blue, and the same in all respects as that previously described. If a very high degree of purity is required, the coloring-matter thus formed may be again dissolved in dilute ammonia-water and the solution again be made acid and boiled, when the coloring-matter will again precipitate in a purer condition, this step being essentially a repetition of the final step described above.

The test above described, by which I determine whether the chemical transformations are complete, is a convenient method of ascertaing that fact; but there are other ways of arriving at the same information. For example, I may take a portion of the solution, and after neutralizing with acid, boiling, and filtering the resulting precipitate, I may add to the coloring-matter, while on the filter, a cold solution of carbonate of ammonia. If the solution passes through the filter, and exhibits a green fluorescence while in a body, either in a test-tube or other vessel, the operation should be continued. If, on the other hand, it imparts to the ammonium carbonate a blue-black color, the tansformations may be regarded as complete.

I may treat the entire mass of the solution in the same manner as the sample just described. It should be noted, however, that when the ammonium-carbonate solution comes through the filter nearly colorless, its use should be discontinued and followed by pure water, until the water which comes through is of an indigo-blue color, when its use is stopped, and the coloring-matter remaining in the filter is dried at a steam heat.

The coloring-matter formed by my process is almost wholly insoluble in water or in dilute acids. With concentrated sulphuric acid it dissolves, forming a green solution, which becomes blue by dilution, and finally precipitates, while with concentrated muriatic acid it yields a purple solution, which becomes, successively, green and blue by dilution, resulting, finally, in precipitation. With bases it combines to form lakes, and is soluble in alkalies, giving a blue solution. It is of great value as a dye, taking the place of indigo, and giving results which are equal, commercially, to those produced by the best qualities of indigo.

What I claim is—

1. The process hereinbefore set forth for the manufacture of a resorcin-blue, said process first consisting in making a solution of resorcin in an excess of ammonia-water, agitating the resulting solution by the alternate or intermittent immersions therein of a copper plate or plates, adding dilute acid in excess, boiling, and filtering, substantially as specified.

2. The process hereinbefore set forth for the manufacture of a resorcin-blue, said process consisting in first making a solution of resorcin in solution of caustic ammonia, adding thereto a solution of ammonio-carbonate of copper or other ammoniacal salt of copper, agitating the mixture by a copper plate dipping or moving therein, immersing a strip of metallic zinc therein to precipitate the copper, filtering, treating the filtrate with dilute sulphuric acid, boiling, filtering, and drying, substantially as described.

3. The composition of matter hereinbefore set forth, the same consisting of a resorcin-blue having an empyric chemical formula of $C_{18}H_{12}N_2O_6$, and exhibiting the reactions and deportment hereinbefore set forth, to wit: practical insolubility in water and dilute aqueous acid solutions, the formation, with concentrated sulphuric and muriatic acids, of a green and a purple solution, respectively, the former becoming blue by dilution and the latter green and then blue, successively, and finally precipitating in both the formation of blue solutions with alkalies, and the property of combining with bases to form lakes, substantially as specified.

HAYDN M. BAKER.

Witnesses:
H. A. HALL,
W. J. MCKENNEY.